United States Patent [19]
Everett et al.

[11] 3,958,771

[45] May 25, 1976

[54] FISHING REEL

[76] Inventors: Woodrow W. Everett, 11801 N. 19th Ave., Phoenix, Ariz. 85029; Edward M. Adams, 4002 W. Union Hills Drive, Glendale, Ariz. 85301

[22] Filed: Sept. 30, 1974

[21] Appl. No.: 510,292

[52] U.S. Cl. ................. 242/84.5 R; 242/84.53; 242/218
[51] Int. Cl.² ........................................ A01K 89/02
[58] Field of Search ............... 242/84.51 R, 84.5 R, 242/84.53, 218, 220, 99

[56] References Cited
UNITED STATES PATENTS

| | | | |
|---|---|---|---|
| 2,269,808 | 1/1942 | Cabassa | 242/218 |
| 2,535,584 | 12/1950 | Lorenz | 242/84.53 |
| 2,550,271 | 4/1951 | Kagel | 242/84.5 R |
| 2,648,506 | 8/1953 | Kirby | 242/218 |
| 2,858,998 | 11/1958 | Nadolskey | 242/84.5 R |
| 2,896,874 | 7/1959 | Nurmse | 242/218 |
| 2,977,065 | 3/1961 | Holahan, Jr. | 242/218 |

*Primary Examiner*—Edward J. McCarthy
*Attorney, Agent, or Firm*—Warren F. B. Lindsley

[57] ABSTRACT

A fishing reel having all of the features of conventional reels normally used in conjunction with rod and fly fishing including the additional features of an adjustable drag with controlled automatic release and a manually operable, mechanical hand brake. The fishing reel is simple in design, comprising a minimum number of parts, each of which performs one or more interrelated functions.

6 Claims, 5 Drawing Figures

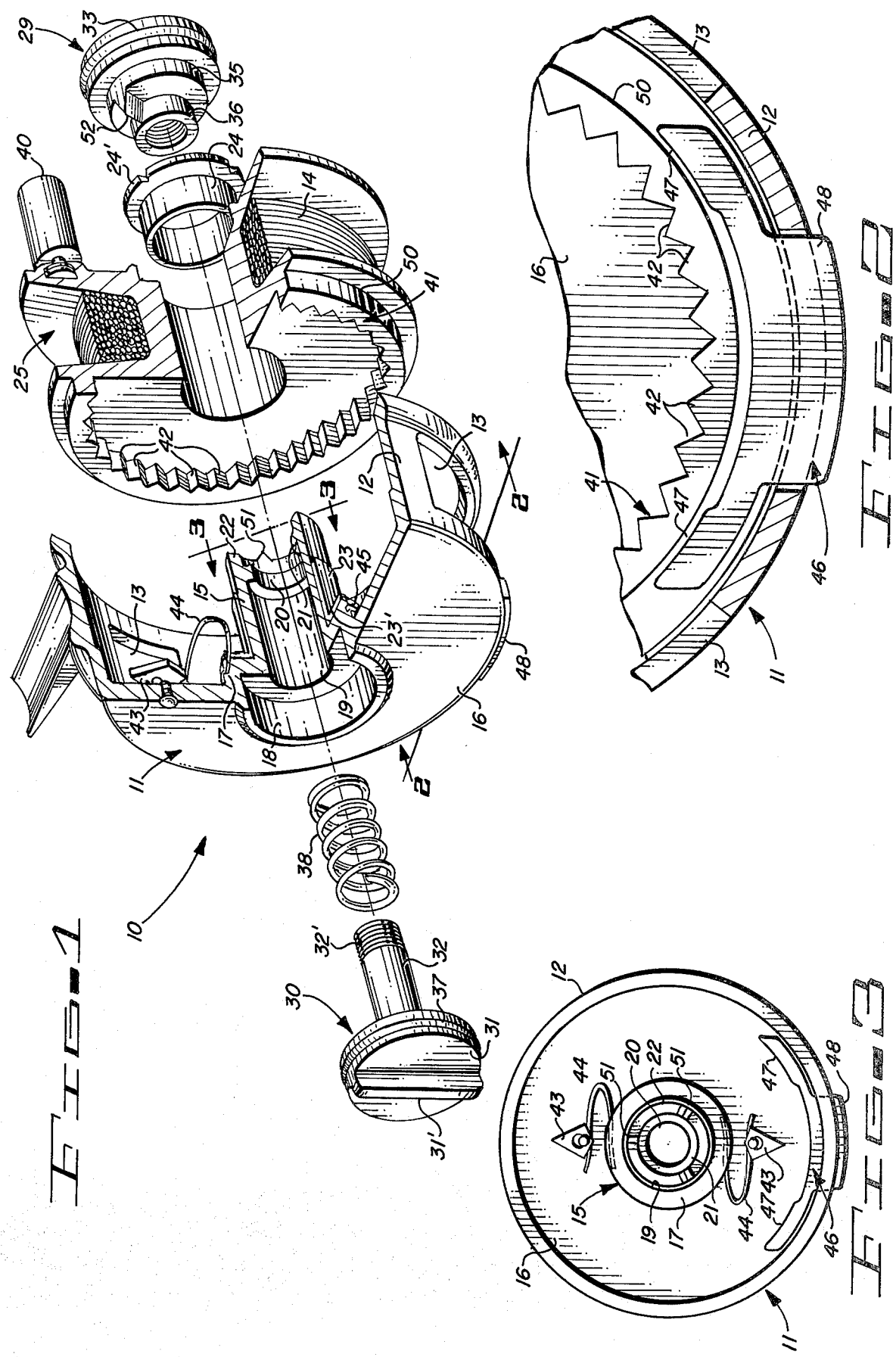

FISHING REEL

BACKGROUND OF THE INVENTION

This invention relates to fishing reels and more particularly to an improved reel for use in rod and fly fishing which includes improved means for providing adjustable drag with controlled automatic release and mechanically operated hand brake.

1. Field of the Invention

This invention is directed to a novel fishing reel that is lightweight, comparatively inexpensive to manufacture, and comprises a minimum number of parts interrelated in their specific functions to provide both manually and automatically operable means for simply and easily controlling the action of fish while being retrieved and landed.

2. Description of the Prior Art

Many types of fishing reels have been utilized when fishing for large fish, but most of these reels have been heavy and cumbersome to handle, consisting of a multitude of unrelated parts and often difficult to disassemble and reassemble for occasional cleaning or line replacing purposes. Further, such reels usually employed a manually operated means for releasing the pre-set drag on the line and lacked suitable sealing means for preventing damage and corrosive action of salt water on the bearings and other rotative components of the reel.

SUMMARY OF THE INVENTION

In accordance with the invention claimed, a new and improved fishing reel is provided comprising a minimum number of component parts fabricated from corrosion-resistant material, with each part performing one or more specific functions in an interrelated assembly which is simple in operation, comparatively inexpensive to fabricate and designed to assure long, useful life.

It is, therefore, one object of this invention to provide an improved fishing reel that may be used in conjunction with any conventional fishing rod and line for the purpose of catching and landing large and small fish.

Another object of this invention is to provide an improved fishing reel that employs a minimum number of corrosion-resistant components that can be quickly and easily assembled or disassembled for cleaning or line changing purposes.

A further object of this invention is to provide a new and improved fishing reel that incorporates a novel means of automatically releasing the adjustable drag on the line for the purpose of quickly retrieving the same.

A still further object of this invention is to provide a new and improved fishing reel employing a sealing means for protecting the bearings and its other rotative parts from the destructive effects of sea water.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings, in which:

FIG. 1 is an exploded perspective view of the component parts of the fishing reel disclosed;

FIG. 2 is an enlarged fragmentary view taken substantially on line 2—2 of FIG. 1 showing the relationship of the mechanical brake to the cylindrical outer cage and inner cylindrical spool surface which it contacts;

FIG. 3 is an elevational view looking in the direction of the arrows on line 3—3 of FIG. 1;

DESCRIPTION OF THE PREFERRED EMBODIMENT

Figure 4:
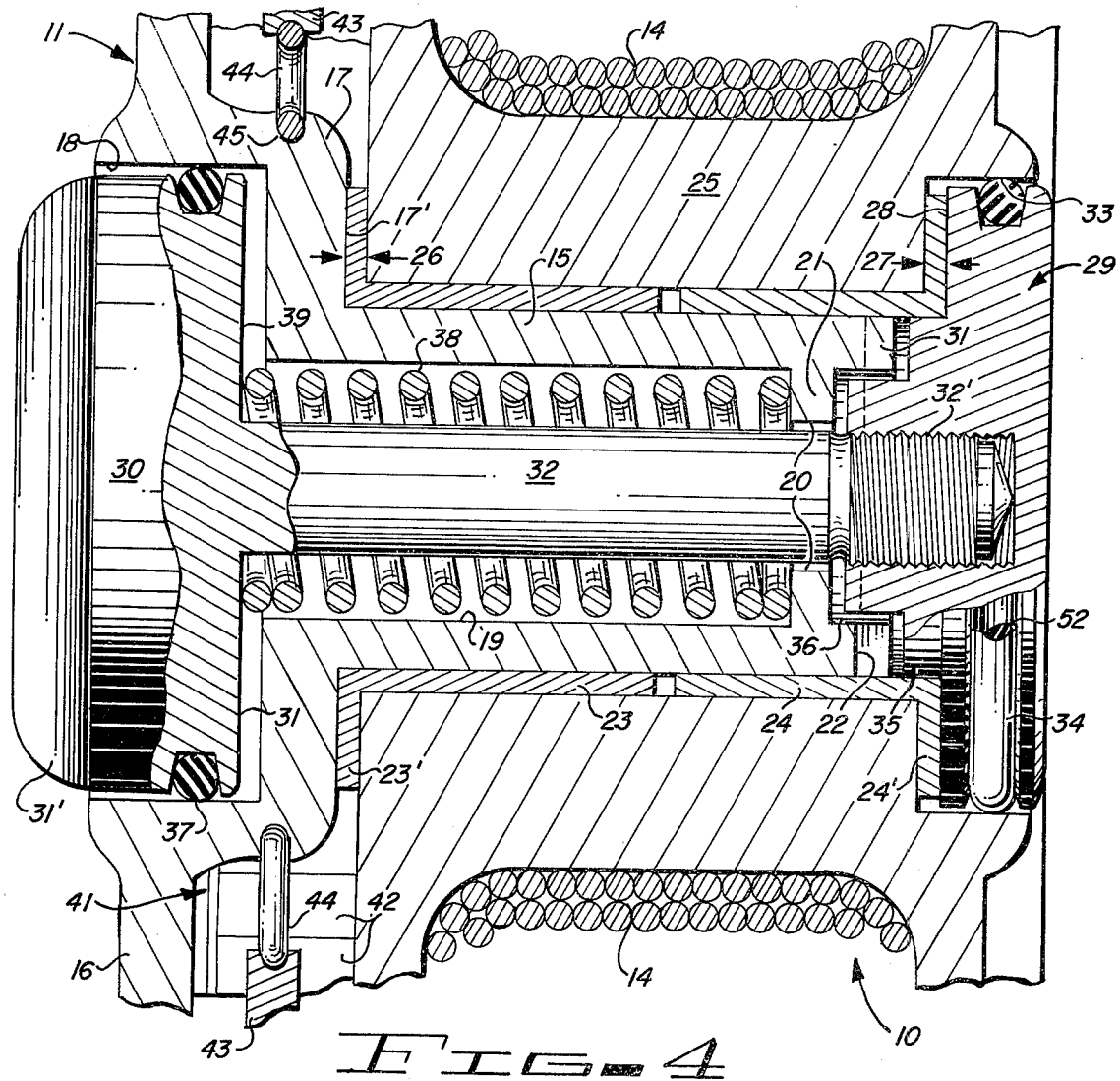
FIG. 4 is an enlarged fragmentary vertical sectional view through the center of the assembled fishing reel of this invention showing all the operating component parts of the device in their relationship to each other.
Figure 5:
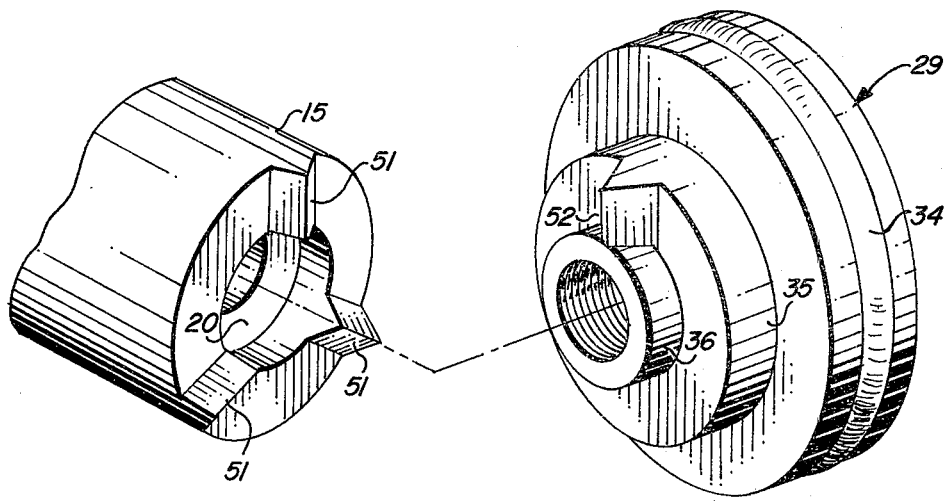
FIG. 5 is a double-angled perspective view showing the respective locations of the stop members on the end surface of the cylindrical bearing portion of the outer cage and the location of the single stop member on the inner end face of the keeper component.

Referring more particularly to the drawings by characters of reference, FIGS. 1 and 4 show the component parts of a fishing reel 10 in exploded and assembled relationship.

The fishing reel comprises a minimum number of parts preferably fabricated of corrosion-resistant material with each part designed to perform one or more specific interrelated functions.

Fishing reel 10 comprises a cylindrical, drum-like exterior housing or cage 11 provided around its peripheral wall 12 with a plurality of arcuate openings 13 forming passages for fishing line 14 and provided with a centrally located, cylindrical hub 15 which is an integral part of cover plate 16 forming a part of cage 11. The outer periphery of hub 17 is larger in diameter at end 17 where it joins cover plate 16 and is provided with a smoothly finished counterbore 18 at end 17 which communicates with a smaller central bore 19 in cylindrical extension 15. A still smaller drilled hole 20 is provided in the exact center of a transverse web 21 formed on the inner surface of bore 19 closely adjacent its extreme outer end 22, as shown in FIGS. 1 and 4.

The outer surface of cylindrical hub 15 and the vertical face 17' of its enlarged portion 17 are smoothly finished to receive and support in direct contact with these surfaces, suitable inner and outer bearings 23 and 24, which are each provided at their opposite ends with circular flanges 23' and 24'. Flanges 23' and 24' are adapted to function as both radial and thrust bearings for the sides and center bore of the rotatable spool or reel 25 which is mounted to rotate on said bearings between the circular flanges 23' and 24'.

The clearance spaces 26 and 27 between the sides of the spool 25, the circular finished face 17' of the enlarged portion 17 of the cylindrical extension 15, and the circular finished face 28 of a keeper member 29 are manually adjustable by the combined action of keeper member 29 and a manually operated adjusting screw member 30. Head 31 of screw member 30 is rotatably mounted in counterbore 18 in the outer face of cover plate 16 and the threaded end 32' of shank 32 is adapted to be threaded into a female thread provided in the exact center of keeper member 29, thus providing a simple means for quickly and easily assembling or disassembling the components of the fishing reel and adjusting or regulating the degree of drag on line 14.

Keeper member 29 is cylindrical in form with the diameter of its largest portion being slightly smaller than the diameter of a counterbore 33 provided in the outer projecting side face of rotatable spool 25. Further, its outer cylindrical surface is provided with a circumferential V-groove in which a suitably sized O-ring 34 is retained which is adapted to contact the finished peripheral surface of counterbore 33 in a tight sealing but yielding relationship therewith. This tight fit provides protection for the bearings and other enclosed rotatable components of the reel from the possible entry of sea water and to further frictionally restrict the rotative movement of the keeper member 29 relative to the rotation of spool 25.

The keeper member 29 is provided on its inner side with two cylindrical bosses 35 and 36, with boss 35 having a finished diameter which is exactly the same as the diameter of cylindrical extension 15, thereby providing a continuing surface upon which the outer bearing 24 may rest in supporting relation therewith. The diameter of the smaller boss 36 is slightly less than the inside bore 19 of the cylindrical extension 15 and is sized to provide suitable clearance between its inner circular face and the outer face of the transverse web 21 in extension 15 to allow for restricted rotative movement of keeper member 29 in counterbore 33.

The cylindrical head portion 31 of the adjusting screw member 30 is provided with a similar circumferential V-groove in its outer peripheral surface which is adapted to retain a suitably sized O-ring 37 in direct sealing but yielding frictional relationship, with the inside finished diameter of counterbore 18 in the outside face of cage 11.

The O-ring 37 not only provides a seal between the cage and the adjusting screw member 30 to protect the bearings and other enclosed vital parts from possible damage by sea water but also functions as a keeper for the screw member and a compression spring 38 to prevent their loss while assembling or disassembling the reel for the purpose of cleaning or changing spool 25. In addition, O-ring 37 allows for the adjustment of drag on line 14 and spool 25 and the holding of this adjustment against the pressure of the compression spring 38 which surrounds shank portion 32 of the adjusting screw. It also bears against the transverse web 21 of the cylindrical extension 15 of the cage and the inside face 39 of the head portion 31 of the adjusting screw.

The head 31 of the adjusting screw member 30 is provided with a finger gripping outer end portion 31' which provides the fisherman with a readily accessible means for rotating the adjusting screw member 30 in a clockwise or counterclockwise direction to thereby increase or decrease the degree of drag imposed on spool 25 and hence on line 14. This turning action causes the male threaded end 32' of the adjusting screw shank 32 to enter farther into the female threaded bore in the center of the keeper member 29 or to be withdrawn therefrom. The keeper member is held substantially in non-rotative relationship by the friction of O-ring 34 on counterbore 33 in spool 25. This action increases or decreases the distance between the finished circular face 17' of enlarged portion 17 of the cylindrical extension 15 and the circular finished inner face 28 of keeper member 29, thereby decreasing or increasing the size of the clearance spaces 26 and 27 in which the respective circular flanges 23' and 24' of bearings 23 and 24 are retained. This action also decreases or increases the thrust imposed on the sides of spool 25 and the bearing flanges interposed between said sides and the circular faces 17' and 28, thereby decreasing or increasing the degree of drag on the spool 25 and retaining such adjustment by the subsequent lengthening or shortening of the compression spring 38 as a result thereof.

The rotatable spool or reel 25 is provided with the usual rotatable crank 40 which is located near the perimeter of the exposed outside surface of the spool. This crank is utilized by the fisherman to manually rotate the spool in either direction for letting out or retrieving line 14 in the usual manner. Spool 25 is also provided with a circular flange 41 which is preferably integral with and projects outwardly from the enclosed side of the spool. This flange is provided with gear teeth 42 around its inside perimeter and when assembled into the housing or cage member 11 are in constant contact with suitable triangular shaped, spring actuated pawls 43, the springs 44 of which are secured in a suitable circumferential groove 45 formed in the outer cylindrical surface of the enlarged portion 17 of the stationary extension 15 of the cage 11. These pawls function as the usual ratchet device in the assembled fishing reel 10 when spool 25 is rotated in either direction.

The assembled fishing reel 10 is provided with a manually operated hand brake 46 preferably arcuate in shape having suitable brake pads 47 and a flat downwardly depending actuating portion 48 which normally extends out through a cutout 49 in the peripheral wall 12 of the stationary cage 11. In this position brake 46 can be forced upwardly by the fisherman to cause pads 47 to contact the outer peripheral finished surface 50 of the circular flange 41 on the rotatable spool 25 in frictional engagement therewith to thereby apply additional resistance to the pull of a large fish on the line and to cause breaking of the line if necessary.

The circular surface at the extreme outer end 22 of the cylindrical extension 15 of cage 11 is provided with at least three integral triangular shaped teeth or lugs 51 preferably spaced 120° apart which project outwardly a sufficient distance to come in contact with a single, similarly shaped tooth or lug 52. Lug 52 is integral with the face of cylindrical boss 35 which is an integral portion of keeper member 29. During the assembly of the reel lug 52 may be positioned in the radial sector between any pair of teeth or lugs 51. In this position lugs 51 function as stop members and propulsion means in conjunction with crank 40, spool 25 and other rotatable parts of the device to automatically release the drag on line 14 for retrieving the same and returning the drag to its original setting, as will be evident from the following description of this important function.

To prevent backlash of line 14 from overrun of spool 25 while stripping off the line or playing a large fish, the adjustable drag with automatic release functions as follows: the desired degree of drag required for tiring the fish is first set by the fisherman by manually rotating the adjusting screw member 30 to cause its threaded end 32' to draw keeper member 29 into closer clamped relationship with circular flange 24' of bearing 24. This action increases the pressure on the sides of spool 25, as previously described to obtain the desired degree of drag which once set will be maintained by the action of compression spring 38 until again manually adjusted by the fisherman.

When the degree of drag on the spool and line has been set as described and crank handle 40 is turned to rotate the spool in a counterclockwise direction, this action causes O-ring 34 and keeper member 29 to be rotated until lug 52 on keeper member 29 contacts one of the lugs or stop members 51 on the stationary extension 15 of cage 11. This action forces spool 25 to rotate on the bearings 23 and 24. To increase the drag, the adjusting screw 30 is turned clockwise, thereby causing threads 32' on the end of shank 32 to draw keeper member 29 inwardly, resulting in more pressure being applied to the compression spring 38, thus increasing the pressure on the circular flanges 23' and 24' of the thrust bearings and increasing the drag imposed on spool 25 and line 14 until the desired degree of drag is obtained.

When it is desired to eliminate the drag on spool 25 for the purpose of retrieving the line, the crank handle 40 may be turned to rotate the spool in a clockwise direction, thereby causing O-ring 34 and keeper member 29 to be rotated in the same direction. This action causes the keeper member to move outwardly on threads 32' at the end of shank 32, thereby reducing the tension on spring 38. This action results in less pressure being applied on the circular flanges 23' and 24' and consequently results in the elimination of the previously set drag on spool 25 and line 14 for the purpose of retrieving the line. In this case, keeper member 29 would rotate only until the single lug or stop member 52 on keeper member 29 strikes one of the lugs or stop members 51 on the extension 15 of the cage, resulting in the elimination of drag for the purpose of quickly retrieving the line.

When crank handle 40 is again turned to rotate spool 25 in a counterclockwise direction, it also rotates O-ring 34 and keeper member 29 on threads 32' until the lug or stop member 52 strikes one of the lugs or stop members 51, thus as previously described returning the degree of drag to its original setting.

Although but one embodiment of the invention has been shown and described, it will be apparent to those skilled in the art that various changes and modifications may be made therein without departing from the spirit of the invention or from the scope of the appended claims.

What is claimed is:

1. A fishing reel employing adjustable drag and controlled automatic release features comprising:
    a hollow housing,
    a spool for winding fishing line around its outer periphery rotatably mounted within said hollow of said housing,
    a plurality of gear teeth fixedly mounted around said spool,
    a ratchet pawl pivotally mounted on said housing for engaging said gear teeth when said spool rotates in a first direction in said housing,
    means for selectively providing a drag on the rotation of said spool in said housing in a second direction,
    said means comprising a bolt extending axially through said housing for threadedly engaging a member bearing against said spool for providing variable frictional producing pressure between engaging bearing surfaces of said spool and said housing,
    means for releasing said drag on said spool comprising a lug mounted on said housing for engaging a protrusion on said member for rotating said member a limited distance only in said first direction thereby unthreading said member to reduce the frictional engaging pressure on said bearing surfaces of said spool and said housing, and
    means mounted on said member for engaging said spool whereby said member is held from unthreading futher off said bolt when said member has unthreaded said limited distance,
    said means mounted on said member for engaging said spool comprising a frictional bearing means mounted on said member for engaging said housing.

2. The fishing reel set forth in claim 1 wherein:
    said bolt extends axially through said housing and said spool.

3. The fishing reel set forth inclaim 1 wherein:
    said frictional bearing means comprises an O-ring in claim in a groove in the outer periphery of said member.

4. The fishing reel set forth in claim 1 in further combination with:
    spring means surrounding said bolt and extending between surfaces on said bolt and said housing for biasing said bearing surfaces of said spool and said housing into engagement with each other.

5. The fishing reel set forth in claim 1 wherein:
    said housing is provided with a slot along a part of its outer periphery,
    a hand-generated braking means mounted on said housing within said slot for extending outwardly of said housing and being movable by the hand of the user of the fishing reel to move inwardly of said housing and into frictional engagement with said spool for selectively retarding the movement of said spool.

6. The fishing reel set forth in claim 1 in further combination with:
    a hand-operated crank mounted on said spool for selectively rotating said spool.

\* \* \* \* \*

UNITED STATES PATENT OFFICE
CERTIFICATE OF CORRECTION

Patent No. 3,958,771         Dated May 25, 1976

Inventor(s) Woodrow W. Everett and Edward M. Adams

It is certified that error appears in the above-identified patent and that said Letters Patent are hereby corrected as shown below:

Claim 3, line 2, cancel "in" and substitute ---mounted---;

line 3, cancel "claim".

Signed and Sealed this

Twenty-first Day of September 1976

[SEAL]

Attest:

RUTH C. MASON
*Attesting Officer*

C. MARSHALL DANN
*Commissioner of Patents and Trademarks*